(12) United States Patent
Goda et al.

(10) Patent No.: US 6,615,713 B1
(45) Date of Patent: Sep. 9, 2003

(54) BAR CODE FORMING METHOD AND APS FILM CARTRIDGE HAVING BAR CODE THEREON

(75) Inventors: Yoshihiko Goda, Hino (JP); Nobuaki Takahashi, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/662,010

(22) Filed: Sep. 14, 2000

(30) Foreign Application Priority Data

Sep. 16, 1999 (JP) ............................................. 11-261988

(51) Int. Cl.⁷ ................................................. B44C 1/24
(52) U.S. Cl. ........................................... 101/32; 101/34
(58) Field of Search ............................. 101/32, 34, 33, 101/31, 28, 27, 21, 9, 4; 355/40; 53/535

(56) References Cited

U.S. PATENT DOCUMENTS

| | | | |
|---|---|---|---|
| 4,181,560 A | * | 1/1980 | Maitland ...................... 101/103 |
| 4,542,690 A | * | 9/1985 | Kikuchi ........................ 101/27 |
| 4,893,555 A | * | 1/1990 | Leyland et al. ............... 101/29 |
| 4,930,911 A | * | 6/1990 | Sampson et al. ............. 101/29 |
| 5,701,538 A | * | 12/1997 | Yasui ........................... 396/512 |
| 5,765,474 A | * | 6/1998 | Esaki et al. .................... 101/4 |

FOREIGN PATENT DOCUMENTS

| | | |
|---|---|---|
| EP | 775934 | 5/1997 |
| JP | 682984 | 3/1994 |
| JP | 8254794 | 10/1996 |

* cited by examiner

*Primary Examiner*—Andrew H. Hirshfeld
*Assistant Examiner*—Anthony H. Nguyen
(74) *Attorney, Agent, or Firm*—Muserlian, Lucas and Mercanti

(57) ABSTRACT

A bar code forming method, which has the step of: forming the bar code which satisfies the following conditions, by transferring at least one portion of the transfer material onto the resin substrate by heating and pressing the transfer material onto the resin substrate, wherein, when the difference of the height between the concave portion formed on the resin substrate by the heating and pressing, and the convex portion protruding on the periphery of the concave portion, is h, and the distance between the top of the convex portion and the edge of the convex portion side of the concave portion, is d, and h is greater than or equal to 0.01 mm but less than or equal to 0.05 mm, and d is less than 0.1 mm.

12 Claims, 4 Drawing Sheets

BAR CODE FORMING METHOD AND APS FILM CARTRIDGE HAVING BAR CODE THEREON

BACKGROUND OF THE INVENTION

The present invention relates to a bar code forming method by which the bar code is formed on a resin substrate by a hot stamping die, and to an APS film cartridge on which a bar code is formed.

In a photographic film cartridge according to the standard of the advanced photo system (hereinafter, called APS film cartridge), the photographic film is wound around a resin spool, and covered by a resin film magazine. On one end of this spool, a data disk as the resin substrate integrally provided with the spool is provided, and the bar code displaying the film data such as the film sensitivity and the number of exposures, is recorded. This bar code can be formed by various methods, and for example, in Japanese Tokkaihei No. 8-254794, a method by which a low level pattern using the data disk surface (black) as it is, and a high level pattern in which the member having the large reflection factor (a transfer material such as the transfer foil) is thermally transferred on the disk surface, are structured and provided, is disclosed. This is a method by which the bar code is provided by so-called hot stamping.

In the hot stamping by which the bar code is formed on the resin substrate, transferring is conducted, at the time of heating and pressing, in such a manner that the resin data disk surface is slightly melted, and the transfer foil as the transfer material is stuck in the data disk. A sectional view of the conventional bar code forming portion of the data disk by the hot stamping after transferring is as shown in FIG. 6. A portion which is heated and pressed by the hot stamping, is a concave portion 31, and the outside of the concave portion is formed into a convex portion 32 by the melt resin. The inclined surface connecting the concave portion 31 and the convex portion 32 is a tapered portion 34. Further outside the convex portion 32 is the resin substrate surface 33 of the original data disk which is not affected by the heating and pressing by the hot stamping, and this is the low level pattern LP. The periphery of the concave portion 31 is rimmed by the resin convex portion 32 into the shape of just a plate of the hot stamping.

On the bar code forming surface which is formed by such the hot stamping, and has the concave portion 31 and convex portion 32 as shown in FIG. 6, it is found that, depending on the shape of the concave portion 31 and the convex portion 32, or the condition of formation of the bar code, the misconception of the bar code reading sensor easily occurs. Specifically, in the APS camera whose sensor has the high sensitivity, it is found that this tendency is more conspicuous.

SUMMARY OF THE INVENTION

The object of the present invention is, in the bar code forming method in which the transfer material is heated and pressed by the hot stamping die and the bar code is formed on the resin substrate by the transferring, to provide a bar code forming method to form the bar code having the quality by which the bar code reading sensor does not cause the misconception of the reading, and to provide an APS film cartridge on which the bar code by which the bar code reading sensor does not cause the misconception of the reading, is formed.

The above described object of the invention can be attained by one of the following structures (1)–(19).

(1) A bar code forming method, which has the step of: forming the bar code which satisfies the following conditions, by transferring at least one portion of the transfer material onto the resin substrate by heating and pressing the transfer material onto the resin substrate, wherein, when the difference of the height between the concave portion formed on the resin substrate by the heating and pressing, and the convex portion protruding on the periphery of the concave portion, is h, and the distance between the top of the convex portion and the edge of the convex portion side of the concave portion, is d, $0.01 \text{ mm} \leq h \leq 0.05 \text{ mm}$, and $d < 0.1 \text{ mm}$.

(2) In the method of the structure (1), the step for forming the bar code is conducted by heating and pressing the transfer material by the hot stamping die.

(3) In the method of the structure (2), the angle $\theta_3$ formed between the concave portion, and the tapered portion connecting the concave portion to the convex portion, is not more than 135°.

(4) In the method of the structure (2) or (3), the angle $\theta_1$ formed between the pressing surface of the hot stamping die by which the resin substrate is heated and pressed through the transfer material, and the side surface connected to the pressing surface, is not larger than 90°.

(5) In the methods of the structures (2) to (4), a supporting member is provided on the rear side of the surface of the resin substrate on which the bar code is formed, and an elastic body is provided on the surface which is in contact with the resin substrate, of the supporting member.

(6) In the method of the structure (5), the elastic body is rubber, and the thickness of the rubber is 0.5–2 mm, and the rubber hardness is 70 degrees –100 degrees.

(7) In the method of the structure (2), the difference of the height k between the concave portion, and the resin substrate surface which is not affected by the heat by the heating and pressing, is not smaller than 1/10 times and not more than 1/5 times of the amount of undulation in the bar code forming portion of the resin substrate.

(8) In the methods of the structures (2) to (7), the amount of the undulation in the bar code forming portion of the resin substrate is not more than 30 μm.

(9) In the methods of the structures (2) to (8), by setting the temperature of the leading edge portion contacting with the resin substrate of the hot stamping die to 120° C.–180° C., and the time of the heating and pressing to not longer than 0.4 sec, the difference of the height is made to not smaller than 0.01 mm, and not more than 0.05 mm.

(10) In the methods of the structures (2) to (9), the surrounding of the heat transfer portion of the hot stamping die is covered by the heat insulating material.

(11) In the methods of the structures (2) to (10), the resin substrate is the data disk of the APS film cartridge.

(12) In the method of the structure (1), $d > 0$.

(13) The bar code forming method, which having the following step: a step in which the bar code is formed in such a manner that at least one portion of the transfer material is transferred onto the resin substrate, by heating and pressing the transfer material onto the resin substrate by the hot stamping die so that the following conditions are satisfied, wherein, when the temperature of the leading edge portion of the hot stamping die is T, the pressing force by the hot stamping die is F, and the pressing time of the hot stamping die is t, $120° \text{C.} \leq T \leq 180° \text{C.}$, $100 \text{ kgf} \leq F \leq 400 \text{ kgf}$, and $0.2 \leq t \leq 0.4$.

(14) In the method of the structure (13), when the cooling time is S, the heating and pressing is carried out so that the condition of $0.2 \text{ sec} \leq S \leq 0.4 \text{ sec}$ is satisfied.

(15) In the method of the structure (13), the load deflection temperature of the resin substrate is 100–110° C. when the load is 18.5 kgf/cm².

(16) In the method of the resin substrate is 100–110° C. when the load is 18.5 kgf/cm².

(17) In the film cartridge, a spool around which the film is wound, and the data disk which is arranged on the spool, and has the resin substrate in at least one portion, wherein the data disk has the bar code formed by heating and pressing the transfer material, and the bar code portion satisfies the following conditions: when the difference of the height between the concave portion formed on the resin substrate by the heating and pressing, and the convex portion protruding on the periphery of the concave portion, is h, and the distance between the top of the convex portion and the edge of the convex portion side of the concave portion, is d, 0.01 mm≦h≦0.05 mm and d<0.1 mm.

(18) In the film cartridge of the structure (17), the film cartridge is the APS film cartridge.

(19) In the film cartridge of the structure (17), the bar code portion is formed by the hot stamping die.

Further, the preferred structures 1–11 are as follows.

1. A bar code forming method, in which the transfer material is heated and pressed, and the bar code is formed onto the resin substrate by transferring by the hot stamping die, the bar code forming method is characterized in that: after the formation of the bar code, the difference of the height h between the concave portion formed on the resin substrate by the heating and pressing by the hot stamping die, and the convex portion protruding on the periphery of the concave portion, is not smaller than 0.01 mm, and not more than 0.05 mm, and the distance d between the top of the convex portion and the edge of the convex portion side of the concave portion, is not larger than 0.1 mm.

2. The bar code forming method according to the method 1, wherein the angle $\theta_3$ formed between the concave portion, and the tapered portion connecting the concave portion to the convex portion, is not more than 135°.

3. The bar code forming method according to the method 1 or 2, wherein the angle $\theta_1$ formed between the pressing surface of the hot stamping die to heat and press onto the resin substrate through the transfer material, and the side surface connecting to the pressing surface, is not larger than 90°.

4. The bar code forming method according to any one of the methods 1–3, wherein a supporting member is provided on the rear side of the surface of the resin substrate on which the bar code is formed, and an elastic body is provided on the surface of the resin substrate with which the supporting member comes into contact.

5. The bar code forming method according to the method 4, wherein the elastic body is rubber, and the thickness of the rubber is 0.5–2 mm, and the rubber hardness is 70 degrees to 100 degrees.

6. The bar code forming method according to any one of the methods 1–5, wherein the difference of the height k between the concave portion, and the surface of the resin substrate which is not affected by the heating of the hot stamping die, is 1/5 to 1/10 of the amount of the undulation in the bar code forming portion of the resin substrate.

7. The bar code forming method according to any one of the methods 1–6, wherein the amount of the undulation in the bar code forming portion of the resin substrate is not larger than 30 μm.

8. The bar code forming method according to any one of the methods 1–7, wherein, when the temperature of the leading edge portion which is in contact with the resin substrate of the hot stamping die is 120° C.–180° C., and the heating and pressing time is not more than 0.4 sec, then, the difference of the height h is not smaller than 0.01 mm, and not more than 0.05 mm.

9. The bar code forming method according to any one of the methods 1–8, wherein the surrounding of the heat transfer portion of the hot stamping die is covered by the heat insulating material.

10. The bar code forming method according to any one of the methods 1–9, wherein the resin substrate is the data disk of the APS film cartridge.

11. The APS film cartridge having the bar code formed by heating and pressing the transfer material by the hot stamping die, the APS film cartridge is characterized in that: after the formation of the bar code, the difference of the height h between the concave portion formed on the resin substrate by the heating and pressing by the hot stamping die, and the convex portion protruding on the periphery of the concave portion, is not smaller than 0.01 mm, and not more than 0.05 mm, and the distance between the edge of the concave portion side of the convex portion and the edge of the convex portion side of the concave portion, is not larger than 0.1 mm.

DETAILED DESCRIPTION OF THE PREFERRED EMBODIMENT

Figure 1:
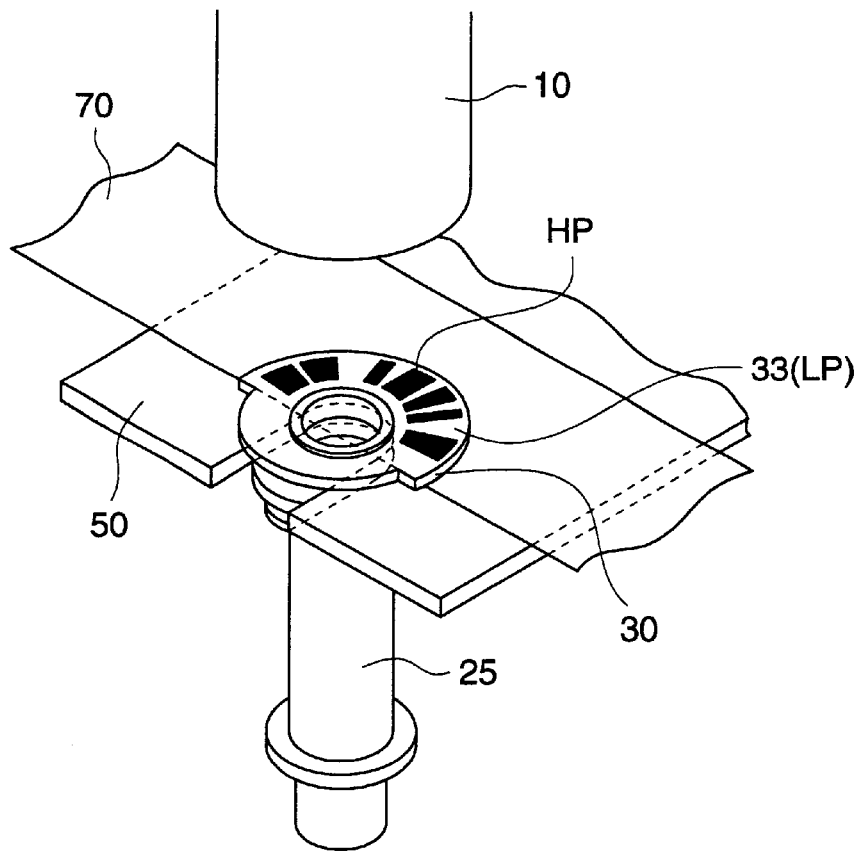
FIG. 1 is a typical view showing the state in which a bar code is formed on a spool of an APS film cartridge by the hot stamping die.

Referring to the drawings, the embodiment of the present invention will be described below, however, the present invention is not limited to that.

FIG. 1 is a typical view showing the state in-which a bar code is formed on a spool of an APS film cartridge by the hot stamping. In the drawing, numeral 10 is a hot stamping die, numeral 25 is a spool, numeral 30 is a resin data disk integrally provided on the one end of the spool, numeral 50 is a support member provided on the rear side of the data disk, numeral 70 is a transfer material, sign HP is a high level pattern transferred onto the data disk, numeral 33 is a resin substrate surface on which the data disk surface is exposed as it is (low level pattern LP), and the HP and 33 (LP) constitute the bar code. From the lower side of the drawing, the support member 50, data disk 30, and the transfer material 70 are superimposed in this order, and the hot stamping die 10 is lowered from the above, and heats and presses, and thermally fuses the transfer material 70 into the shape of the pressing surface of the hot stamping die 10, and transfers it onto the data disk 30.

As the resin substrate used in the present invention, specifically not limited, but, in the case of the data disk of the APS film cartridge, a black HIPS (polystyrene resin including rubber), and its softening point is about 100° C., are preferable.

As the transfer material used for the present invention, when it is the material which can be sensed by the bar code reading material, it is not specifically limited, however, in the case of the hot stamping for the data disk of the APS film cartridge, the silver material(reflection factor is 70–80%), and the melting temperature is 90–100° C., are preferable. As the layer construction in this case, the PET film (16 μm) is a supporting body, and the peeling layer (0.5 μm), protection layer (1 μm), aluminum evaporation layer (500 Å), and acrylic adhesive agent layer (2–3 μm) are superimposed thereon. For this transfer material, the hot stamping die heats and presses from the PET film side. Incidentally, the reflection factor can be calculated in such a manner that the ray of light of the wavelength 900±40 nm, is made to be incident upon at the incidence angle of 10–20°, the ray of light reflected at the reflection angle of 10–20° is measured, and the reflection factor is calculated from a ratio of the amount of the incidence light and the amount of the reflected light.

Figure 2:
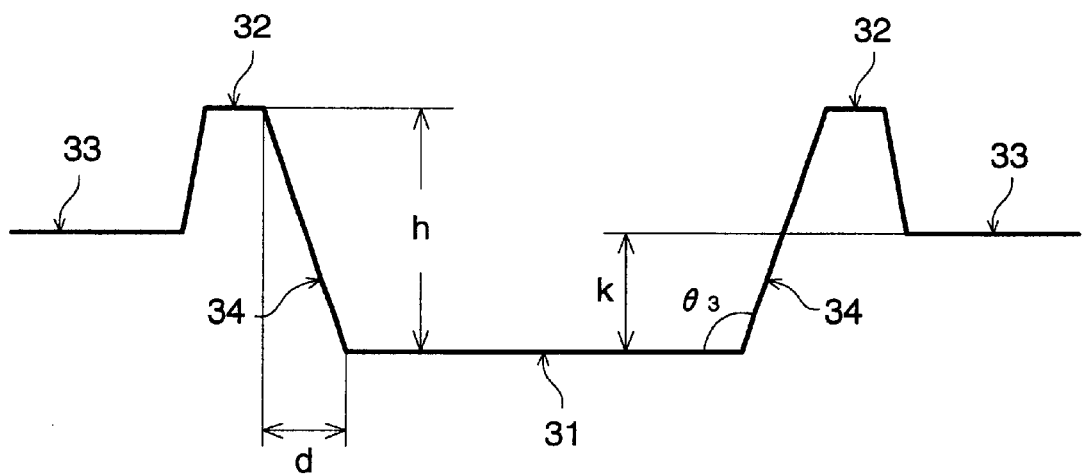
FIG. 2 is a sectional view showing the shape of the leading edge portion of a hot stamping die which can be used for the bar code forming method of the present invention.

FIG. 2 in which the circumference direction of FIG. 1 is positioned as the horizontal axis, is a sectional view for explaining the shape of the resin substrate after the bar code formation. In FIG. 2, the transfer material (high level pattern) which is thermally fused and transferred, is neglected in illustration. The resin substrate is thermally fused by the pressing surface of the hot stamping die, and the portion which is recessed corresponding to the area of the pressing surface, is the concave portion 31. The fused resin stands up on the periphery of the concave portion 31 and forms the bank-like convex portion 32. The surface connecting the concave portion 31 to the convex portion 32 is the tapered portion 34. An angle formed between the concave portion 31 and the tapered portion 34 is $\theta_3$. When the tapered portion 34 draws the curved line, an angle formed between the concave portion 31 and the line connecting the top (highest portion) of the convex portion 32 to the edge of the convex portion side of the concave portion 31, is $\theta_3$. The difference in the height h is the difference in the height between the concave portion 31 (when it is inclined, the lowest position) and the top of the convex portion 32. Further, the distance d is the distance between the top of the convex portion 32 and the edge of the convex portion 32 side of the concave portion 31. The outside of the convex portion is the surface 33 of the resin substrate (low level pattern) which is not affected by the heating and pressing of the hot stamping die. Further, the difference in height k is the difference in height between the concave portion 31 and the resin substrate surface 33.

The shape of the bar code formed surface of the resin substrate of the present invention is: the difference in height h is not smaller than 0.01 mm, and not more than 0.05 mm; and the distance d is not larger than 0.1 mm. By satisfying this shape, the reading misconception is decreased, and the transferring can be satisfactorily conducted, and the damage due to the external stress is decreased in the transferred pattern, and problems of the breakage of the transfer material, or the generation of the rag from the transfer material, are suppressed. Preferably, d>0.

Further, when the angle $\theta_3$ formed between the concave portion 31 and the tapered portion 34 is not more than 135°, the effect of the present invention can be further attained. Preferably, $\theta_3 > 90°$.

Figure 3:
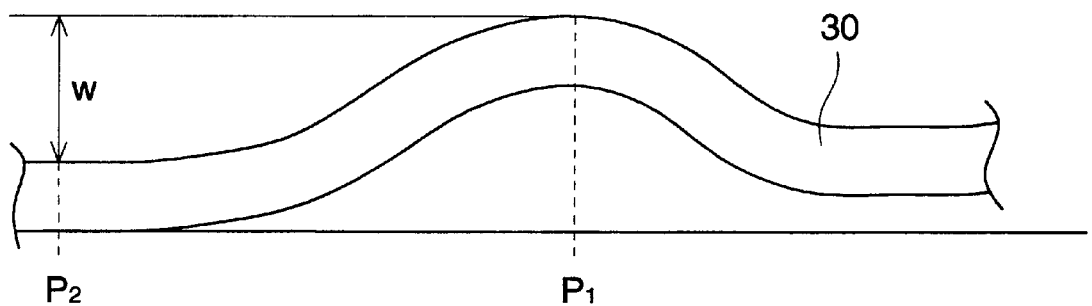
FIG. 3 is a typical view for explaining the case where an elastic member is provided on a support member of the bar code forming apparatus in the bar code forming method of the present invention.

FIG. 3 is a typical view for explaining the undulation in the bar code forming portion of the resin substrate before bar code formation. Numeral 30 is the resin material (data disk) before the bar code formation. The bar code forming portion is a portion which is recognized as the bar code by the structure of the high level pattern and the low level pattern, after the transfer material is transferred. The irregularity of the thickness of the resin substrate when the resin substrate of the bar code forming portion before the bar code formation, is viewed horizontally, is the undulation. The amount of the undulation w is the difference in the height between the highest position $P_1$ and the lowest position $P_2$ when the bar code forming portion before the bar code formation is placed on the plane. As the measuring method, the bar code forming portion is placed on the rotating stand having the plane surface, the rotating stand is rotated, the height is read by the dial gauge, and the minimum value is subtracted from the maximum value, then, the result is the amount of the undulation w. When the difference in the height k between the concave portion 31 and the resin material surface 33 after the bar code formation, described in FIG. 2, is between 1/10–1/5 of the amount of the undulation w of the bar code forming portion before the bar code formation, the breakage of the high level pattern, or the generation of the rag is eliminated, and further, the reading misconception can be decreased, thereby, it is preferable. For example, in the case where the amount of the undulation of the whole range of the barcode forming portion before the bar code formation, is 50–60 μm, when the difference in the height k after the bar code formation is not smaller than 10 μm, the transferring can be satisfactorily conducted, however, in the case where the amount of the undulation is 50 μm, when the difference in the height k after the bar code formation is not more than 10 μm, the reading misconception can be fully decreased, and when the height k is not smaller than 5 μm, the transferring can be satisfactorily conducted, and the breakage of the pattern or the generation of the rag can be decreased, and the damage due to the external stress can also be decreased.

Further, when the amount of the undulation w of the bar code forming portion before the bar code formation is not more than 30 μm, in the same manner, the breakage of the high level pattern or the generation of the rag can be decreased, and the bar code formation with the uniform quality can be attained, and the reading misconception is decreased.

The shape of the bar code formed resin substrate surface described in the above FIG. 2 or FIG. 3, can be attained when the resin substrate, hot stamping die, or the pressing condition is made to the optimum conditions. These optimum conditions for attaining the bar code formation will be described below including the description of FIG. 4–FIG. 5(b).

The pressing condition of the hot stamping die is appropriately determined by the relationship between the resin substrate and the transfer material, and in the case of the pressing onto the data disk of the APS film cartridge, when it is determined as following, the shape of the bar code formed resin substrate surface can be attained, and preferable.

(1) The temperature of the leading edge portion: 120° C.–180° C., (preferably, 140° C.–170° C., and more preferably, 155° C.–160° C.)

(2) The pressing force: 100–400 kgf (preferably, 220 kgf: the pressing by the air cylinder, etc.)

(3) The pressing time: 0.2–0.4 sec (preferably, 0.2–0.3 sec)

(4) The cooling time: 0.2–0.4 sec (preferably, 0.2–0.3 sec)

Incidentally, the cooling time is the time necessary for peeling off the transfer material from the data disk after retreating the hot stamping die from the resin substrate (after the pressing).

Incidentally, it is preferable that the above conditions (1) to (4) are applied for the film cartridge in which, specifically, the load bending temperature regulated by JIS K7191 is 100–110° C., when the load is 18.5 kgf/cm$^2$.

Figure 4:
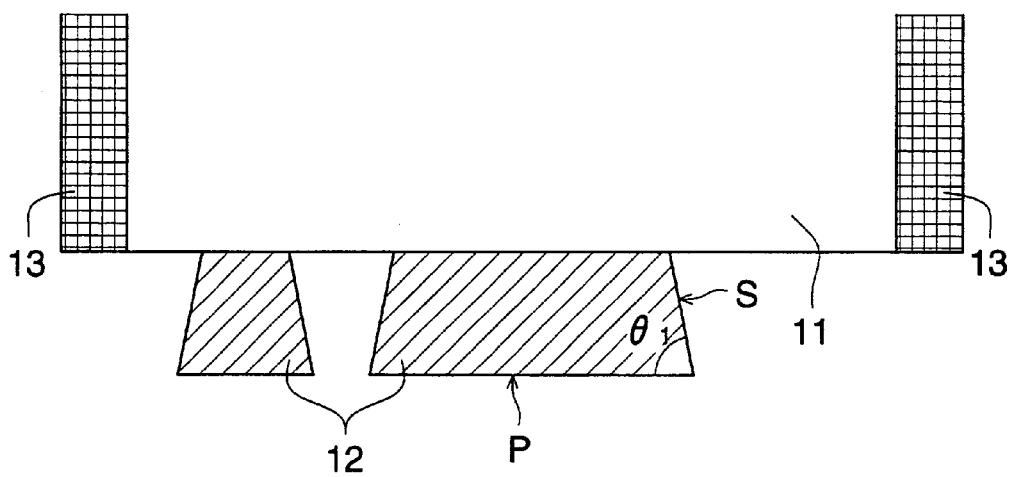
FIG. 4 is a sectional view for explaining the shape a resin substrate after the bar code formation.
Figure 5:
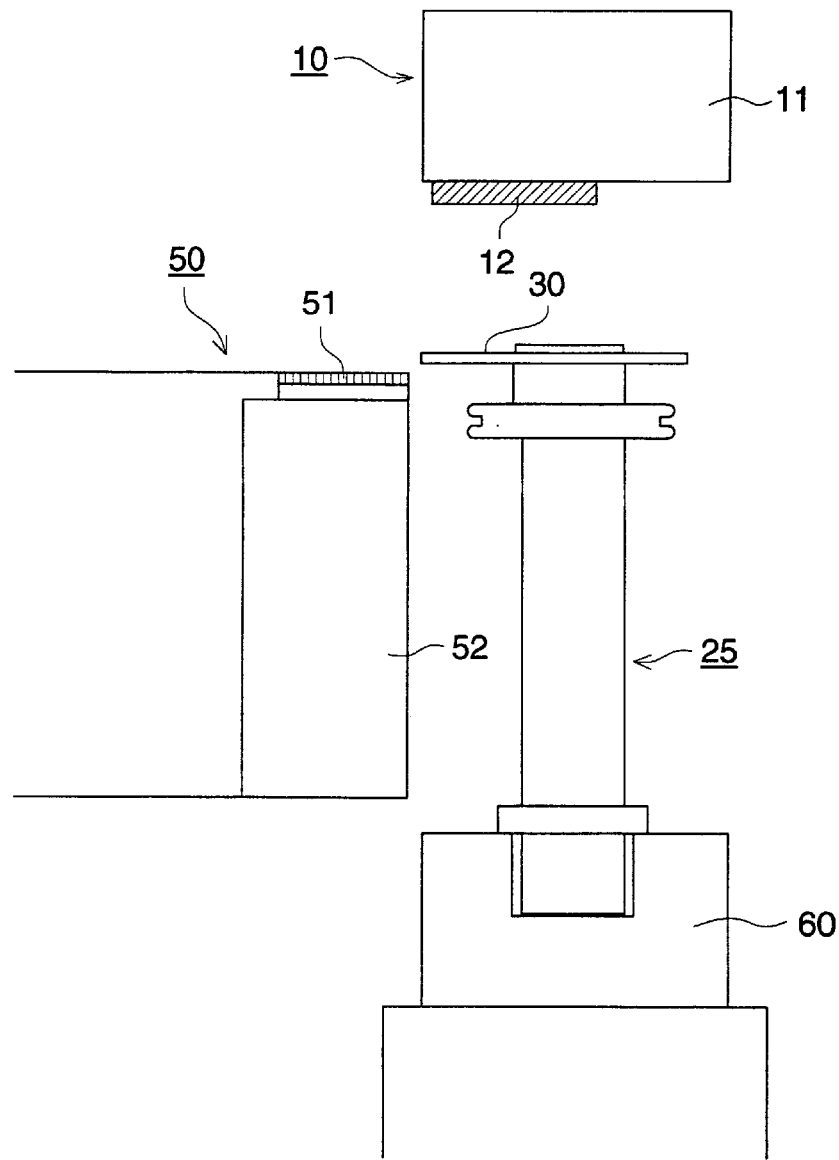
FIGS. 5(a), and 5(b) are typical views for explaining an undulation in the bar code forming portion of the resin substrate before the bar code formation.
Figure 5:
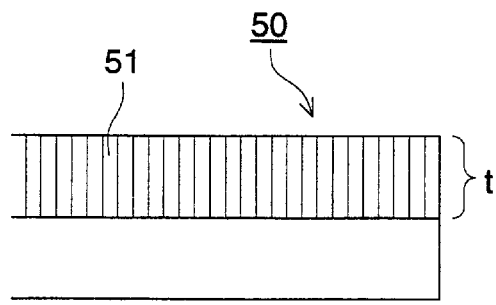
Figure 6:
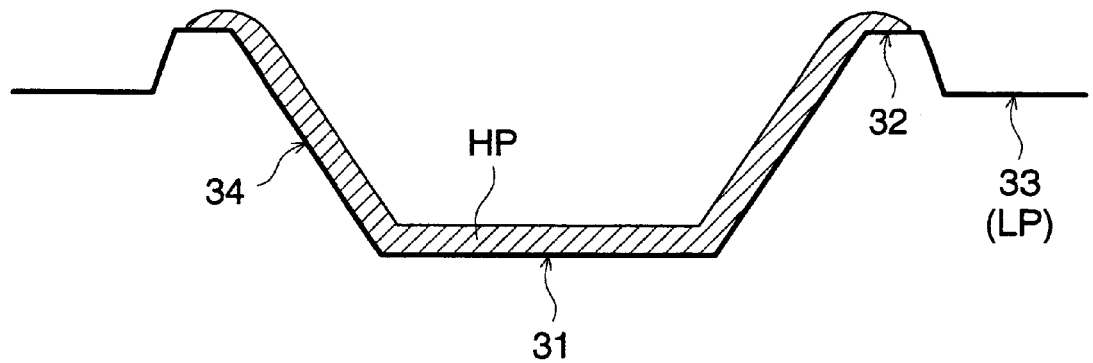
FIG. 6 is a sectional view of the bar code forming portion of the conventional data disk after transferring

FIG. 4 is a sectional view showing the shape of the leading edge portion of the hot stamping die 10 which can be used for the bar code formation of the present invention. In the drawing, numeral 11 is a heat transfer portion, numeral 12 is the leading edge portion, numeral 13 is a heat insulating material, P is a pressing surface for heating and pressing onto the resin substrate, and S is a side surface connecting to the pressing surface. The case where an angle formed between the pressing surface P of the hot stamping die and the side surface S is not larger than 90°, is shown. Normally, the leading edge of the hot stamping die is generally formed in such a manner that an angle formed between the pressing surface P and the side surface S is 90°, for the easiness of its processing, however, it is an unexpectable effect that, when this angle is not larger than 90°, the shape of the bar code formed resin substrate surface described in above FIG. 2 or FIG. 3 can be easily attained. Preferably, the angle formed between the pressing surface P and the side surface S is not more than 85°.

The leading edge portion 12 of the hot stamping die 10 is detachably attached onto the lower side of the heat transfer portion 11. The leading edge portion 12 is structured by the pressing surface P and the side surface S, and by heating and pressing the pressing surface P onto the transfer material, the transferring of the bar code onto the data disk is conducted.

Also for the heat transfer portion 11 of the hot stamping die used for the present invention, the known heat transfer means can be used, however, in the case of the stamping onto the data disk of the APS film cartridge, it is preferable that a cartridge heater of 500 W is arranged in the heat transfer portion 11 as a main heater, and further, the cartridge heater of 70 W is arranged near the trailing edge portion 12 of the hot stamping die in the heat transfer portion 11 as an auxiliary heater.

As the heat insulation material 13, the material in which the glass fiber is hardened by the non-organic bond, or the material in which noncombustible heat insulation laminated plate is adhered onto the periphery by the thickness of about 10 mm, is listed. A method by which the heat insulating material is provided on the periphery of the heat transfer portion, is conducted by winding the sheet-like insulation member around the heat transfer portion.

It is preferable that a thermocouple (platinum resistor) is provided near the trailing edge portion 12, and the measurement value of the temperature is fed back to both heaters, and the temperature is adjusted.

AS the material of the leading edge portion 12, the metal or ceramic normally used for the hot stamping can be used, however, the steel such as SKD is preferable. Further, the angle $\theta_1$ of the leading edge portion 12 can be formed by the normal processing method such as the electric discharge machining, or polishing processing.

For the drive of vertical movement of the hot stamping die when the hot stamping die is pressed, an air cylinder, or mechanical press can be used. At the time of pressing, it is necessary that the pressing surface P and the receiving surface of the support member 50 are located almost in parallel, and at this time, it is preferable that the deviation from the parallelism of the pressing surface P with the resin substrate is within 30 μm.

FIGS. 5(a) and 5(b) are typical views for explaining the case where the elastic member is provided on the supporting member 50, in the bar code forming method of the present invention. When the elastic member is attached to the supporting member, the shape of the bar cord formed resin substrate surface described in above FIG. 2 or FIG. 3 can be easily attained, which is a new discovery.

FIG. 5(a) is a side view of the bar code forming apparatus, and FIG. 5(b) is a partial enlargement view of the supporting member of the bar code forming apparatus. In the drawing, numeral 10 is a hot stamping die, numeral 25 is a spool, numeral 30 is a disk, numeral 60 is a spool holder, and numeral 50 is a supporting member to support the data disk from the reverse side (rear side) to the hot stamping die 10. In FIG. 5(a), the spool 25 is fixed by the spool holder 60 under the condition that the data disk 30 on which the bar code is formed, is located in the upper portion. The supporting member 50 is moved from the left side in the drawing and inserted into the rear side of the bar code forming portion (left side in the drawing) of the data disk 30. The supporting member 50 supports the data disk 30 which is heated and pressed, by the hot stamping die 10 through the transfer material (not shown), so that the bar code forming portion of the data disk 30 is efficiently pressed by the pressing force. The elastic member 51 is adhered onto the side which is in contact with the data disk 30, of the supporting member 50, and the more uniform pressing force can be loaded onto the bar code forming portion of the data disk 30, as compared to the case where the elastic member is not provided, and thereby, the problem of the breakage of the high level pattern or the generation of the rag can be prevented. Thereby, the shape of the bar code formed resin substrate surface as described in above FIG. 2 or FIG. 3 can be attained and the misconception can be decreased.

When the thickness t shown in FIG. 5(b) of the elastic member 51 is 0.5–1 mm, the more effect can be attained. When the elastic member 51 is the material having the elasticity, it is not specifically limited, but rubber is preferable, and its hardness is 80 degrees–100 degrees is more preferable. In the rubber materials, the urethane rubber of rubber hardness of 90 degrees–100 degrees is most preferable.

Further, it is preferable that the supporting member 50 is reinforced with the rib 52, except the portion inserted into the lower side of the data disk 30, so that the supporting member 50 is not bent even when being loaded by the hot stamping die. Incidentally, when the above described d, h, k, amount of the undulation, $\theta_1$ and $\theta_3$, are satisfied in the direction in which the reading apparatus is relatively moved to the bar code, at least at the time of bar code reading, these are allowable, and it is specifically preferable that these are satisfied also in the direction perpendicular the above direction.

Example 1

Samples 1–8 in which the bar code forming apparatus by the hot stamping is used, and the angle formed between the pressing surface P of the leading edge of the hot stamping die and the side surface S, and the existence of the elastic material of the supporting member, and the temperature of the leading edge portion of the hot stamping die, are changed as shown in Table 1, and except those, the bar code is formed under the following conditions, are made. In respective samples, the difference in height h between the concave portion on the resin substrate after the bar code formation, and convex portion protruding on the periphery of the concave portion; the distance d between the top of the convex portion, and the edge of the convex portion side of the concave portion; angle $\theta_3$ formed between the concave portion, and the taper portion connecting the concave portion to the convex portion; and the results in which the effects by those are estimated by the following estimation method, are collectively shown in Table 1.

Incidentally, the difference in height k between the concave portion and the resin substrate surface which is not affected by the heating of the hot stamping die, is within the range of 0.01–0.05 mm for all samples.

Resin Substrate

The data disk of the APS film cartridge. Made of black HIPS (polystyrene resin including rubber). The softening point is 100° C.

Transfer Material

The laminated film which is silver material, whose reflection factor of 70–80%, and the melting temperature is 95° C. The layer structure is as follows: from the pressing surface side of the hot stamping die, the PET film (16 $\mu$m)/peeling layer (0.5 $\mu$m)/protective layer (1 $\mu$m)/aluminum evaporation layer (500 Å)/acrylic adhesive agent layer (2–3 $\mu$m).

Hot Stamping Die

The hot stamping die shown in FIG. 4 and FIGS. 5(a) and 5(b) is used. The leading edge portion is made of SKD steel.

An angle $\theta_1$ formed between the pressing surface P of the leading edge portion and the side surface S: 80°–85° (Table 1). The heat transfer portion: A 500 W cartridge heater is arranged as a main heater on the reverse side to the pressing surface P of the leading edge portion, and further, a 70 W cartridge heater is arranged as an auxiliary heater near the leading edge of the hot stamping die. The heat insulation material in which glass fibers are hardened by the non-organic bond into the sheet-like, is adhered on the periphery of the heat transfer portion. Further, a thermocouple (platinum resistor) is provided near the leading edge portion, and the measurement value of the temperature is fed back to both heaters, and the temperature is adjusted.

Supporting Member

When the elastic member is used, the urethane rubber of the rubber hardness 95 is used, and its thickness t is 1 mm. Further, the supporting member is adjusted so that the deviation of the pressing surface of the hot stamping die and resin substrate from the parallelism is within 30 $\mu$m. (The pressing conditions of the hot stamping die)

The temperature of the leading edge portion: 110–185° C. (Table 1), the pressing force: 220 kgf, the pressing time: 0.3 sec., the cooling time: 0.3 sec.

Estimation Method

Relating to the reading misconception, a bar code reading measuring device in which a camera with low signal output is used as a base, is made, and referring to the level of the signal output, the reading misconception is judged by the right or wrong of the reading. Further, relating to the transferability, the existence of the breakage of the transfer is visually estimated.

TABLE 1

|  | Angle of leading edge portion $\theta_1$ | Temperature of leading edge portion (° C.) | Existence of elastic member | Difference in height h (mm) | Distance d (mm) | Angle $\theta_3$ | Reading misconception | Transferability | Note |
|---|---|---|---|---|---|---|---|---|---|
| Sample 1 | 80° | 155 | yes | 0.05 | 0.01 | 100° | ○ | ○ | P. I |
| Sample 2 | 80° | 185 | yes | 0.11 | 0.06 | 110° | Δ | ○ | C. E |
| Sample 3 | 90° | 155 | yes | 0.05 | 0.05 | 135° | ○ | ○ | P. I |
| Sample 4 | 90° | 155 | no | 0.07 | 0.05 | 130° | ○ | Δ | C. E |
| Sample 5 | 90° | 185 | yes | 0.11 | 0.13 | 140° | X | ○ | C. E |
| Sample 6 | 90° | 185 | no | 0.13 | 0.13 | 138° | X | Δ | C. E |
| Sample 7 | 90° | 110 | yes | 0.005 | 0.002 | 120° | Δ | Δ | C. E |
| Sample 8 | 90° | 110 | no | 0.004 | 0.002 | 125° | X | X | C. E |

*P. I: Present Invention
C. E: Comparative Example
**Reading misconception:
○ represents that reading misconception does not exist;
Δ represents that reading misconception slightly exists;
X represents that reading misconception exists in more than 80% of the Sample;
*** Transferability:
○ represents that transfer failure does not exist;
Δ represents that transfer failure slightly exists;
X represents that transfer failure exists in more than 80% of the Sample.

It can be seen that the samples of the present invention are excellent for the prevention of both the reading misconception and the breakage of the transfer material.

In the bar code forming method in which the transfer material is heated and pressed by the hot stamping die, and bar code is formed by the transferring, the present invention can provide the bar code forming method to form the bar code having the quality in which the bar code reading sensor does not cause the reading misconception, and APS film cartridge on which the bar code in which the bar code reading sensor does not cause the reading misconception, is formed.

What is claimed is:

1. A bar code forming method, comprising the steps of:
   heating and pressing a transfer material onto a resin substrate, thereby transferring at least one portion of the transfer material onto the resin substrate so that a bar code is formed, wherein the bar code satisfies the following conditions:

$$0.01 \text{ mm} \leq h \leq 0.05 \text{ mm, and } d < 0.1 \text{ mm}$$

wherein h represents a difference of a height between a concave portion formed on the resin substrate by heating and pressing, and a convex portion protruding on a periphery of the concave portion, and d represents a distance between a top of the convex portion and an edge of a convex portion side of the concave portion.

2. The bar code forming method of claim 1, wherein the step of the heating and pressing the transfer material is conducted by a hot stamping die.

3. The bar code forming method of claim 2, wherein an angle $\theta_3$ formed between the concave portion and a tapered portion connecting the concave portion to the convex portion, is not more than 135°.

4. The bar code forming method of claim 2, wherein an angle $\theta_1$ formed between the pressing surface of the hot stamping die by which the resin substrate is heated and pressed through the transfer material, and a side surface connected to the pressing surface, is not larger than 90°.

5. The bar code forming method of claim 2, wherein further comprising the step of:

providing a supporting member on a rear side of the surface of the resin substrate on which the bar code is formed, and an elastic body on a surface which is in contact with the resin substrate, of the supporting member.

6. The bar code forming method of claim 5, wherein the elastic body is rubber, and a thickness of the rubber is 0.5–2 mm, and a rubber hardness is 70 degrees–100 degrees.

7. The bar code forming method of claim 2, wherein a difference of a height k between the concave portion, and the resin substrate surface which is not affected by the heat by the heating and pressing, is not smaller than 1/10 times and not more than 1/5 times of the amount of undulation in the bar code forming portion of the resin substrate.

8. The bar code forming method of claim 2, wherein an amount of the undulation in a bar code forming portion of the resin substrate is not more than 30 μm.

9. The bar code forming method of claim 2, wherein by setting the temperature of a leading edge portion contacting with the resin substrate of the hot stamping die to 120° C.–180° C., and the time of the heating and pressing to not longer than 0.4 sec, the difference of the height is made to not less than 0.01 mm, and not more than 0.05 mm.

10. The bar code forming method of claim 2, wherein a surrounding of the heat transfer portion of the hot stamping die is covered by a heat insulating material.

11. The bar code forming method of claim 2, wherein the resin substrate is a data disk of the APS film cartridge.

12. The bar code forming method of claim 1, wherein the following condition is satisfied: 0.1 mm>d>0.

* * * * *